(12) United States Patent
Sandholzer et al.

(10) Patent No.: US 10,907,036 B2
(45) Date of Patent: Feb. 2, 2021

(54) MULTIMODAL RANDOM HETEROPHASIC POLYPROPYLENE COMPOSITION

(71) Applicant: BOREALIS AG, Vienna (AT)

(72) Inventors: Martina Sandholzer, Linz (AT); Cornelia Tranninger, Linz (AT); Jingbo Wang, Linz (AT); Markus Gahleitner, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/631,018

(22) PCT Filed: Oct. 9, 2018

(86) PCT No.: PCT/EP2018/077388
§ 371 (c)(1),
(2) Date: Jan. 14, 2020

(87) PCT Pub. No.: WO2019/072792
PCT Pub. Date: Apr. 18, 2019

(65) Prior Publication Data
US 2020/0140668 A1 May 7, 2020

(30) Foreign Application Priority Data

Oct. 13, 2017 (EP) .................................... 17196415

(51) Int. Cl.
*C08F 2/00* (2006.01)
*C08L 23/14* (2006.01)

(52) U.S. Cl.
CPC .............. *C08L 23/14* (2013.01); *C08F 2/001* (2013.01); *C08F 2500/00* (2013.01); *C08F 2500/12* (2013.01); *C08F 2800/20* (2013.01); *C08L 2205/02* (2013.01); *C08L 2205/025* (2013.01); *C08L 2205/03* (2013.01); *C08L 2205/06* (2013.01); *C08L 2205/08* (2013.01); *C08L 2207/02* (2013.01); *C08L 2314/02* (2013.01)

(58) Field of Classification Search
CPC ...... C08L 23/12; C08L 23/14; C08L 2207/02; C08F 2500/05; C08F 2500/12
See application file for complete search history.

(56) References Cited

FOREIGN PATENT DOCUMENTS

| EP | 0887379 | A1 | 12/1998 | |
|---|---|---|---|---|
| EP | 0068315 | A1 | 11/2000 | |
| EP | 2546298 | A1 | 1/2013 | |
| EP | 2891667 | A1 | 7/2015 | |
| EP | 3115412 | A1 * | 1/2017 | ............. C08F 4/651 |
| WO | 9212182 | A1 | 7/1992 | |
| WO | 9924478 | A1 | 5/1999 | |
| WO | 9924479 | A1 | 5/1999 | |
| WO | 2004000899 | A1 | 12/2003 | |
| WO | 2004111095 | A1 | 12/2004 | |
| WO | 2013007650 | A1 | 1/2013 | |
| WO | 2013092615 | A1 | 6/2013 | |
| WO | 2013144060 | A1 | 10/2013 | |
| WO | 2015004251 | A1 | 1/2015 | |
| WO | 2015117948 | A1 | 8/2015 | |
| WO | 2017005667 | A1 | 1/2017 | |

OTHER PUBLICATIONS

International Search Report for PCT/EP2018/077388 dated Jan. 18, 2019, 13 pages.
A. J. Brandolini and D. A Hills, "NMR Spectra of Polymers and Polymer Additives", 2000, Marcel Dekker, Inc. New York, 660 pages.
S. Berger and S. Braun, "200 and More NMR Experiments: A Practical Course", 2004, Wiley-VCH, Weinheim, 22 pages.
Examination Report Issued in Indian Patent Application No. 202017004885 dated Aug. 14, 2020, 6 pages.

* cited by examiner

*Primary Examiner* — Richard A Huhn
(74) *Attorney, Agent, or Firm* — Lowenstein Sandler LLP

(57) ABSTRACT

The present invention provides a soft multimodal random heterophasic polypropylene composition (m-Raheco) with improved stiffness and impact behaviour while maintaining optical properties. The multimodal random heterophasic polypropylene composition (m-Raheco) is suitable as material for injection moulding, e.g. for thin walled injection moulded articles. The present invention also describes specific propylene random copolymers as modifiers or compatibilizers in polyolefins and their according use.

13 Claims, No Drawings

MULTIMODAL RANDOM HETEROPHASIC POLYPROPYLENE COMPOSITION

CROSS-REFERENCE TO RELATED APPLICATION(S)

This application is a national phase of International Application No. PCT/EP2018/077388, filed on Oct. 9, 2018, which claims the benefit of European Patent Application No. 17196415.8, filed on Oct. 13, 2017. The contents of these applications are hereby incorporated by reference in their entirety.

FIELD OF THE INVENTION

The present invention provides a soft multimodal random heterophasic polypropylene composition (m-Raheco) with improved stiffness and impact behaviour while maintaining optical properties. The multimodal random heterophasic polypropylene composition (m-Raheco) is suitable as material for injection moulding, e.g. for packaging articles. The present invention describes also the use of specific propylene random copolymers as modifiers in polyolefins.

BACKGROUND INFORMATION

Polymers are increasingly used in different demanding applications. At the same time there is a continuous seek for tailored polymers which meet the requirements of these applications. The demands can be challenging, since many polymer properties are directly or indirectly interrelated. For instance, in the field of packaging there is a strong requirement for soft materials having high transparency and being tough. Heterophasic propylene copolymers are well known in the art and appreciated for their good impact behaviour. Such heterophasic propylene copolymers comprise a matrix being either a propylene homopolymer and/or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high resolution microscopy, like electron microscopy or scanning force microscopy.

It is a continuous request by the industry to have polymers at hand that show better stiffness and better impact behaviour combined with better flowability at the same time and fulfill the various demands from packaging industry.

Polymers with higher stiffness can be converted into articles with lower wall thickness, allowing material and energy savings. The resulting articles also exhibit better stability in steam sterilization and hot-filling.

Polymers with good impact behaviour are also desired in consumer related articles to safely keep the content even when dropped.

Polymers with good impact behaviour at temperatures below 0° C. are especially desired for frozen food applications.

Good processability is required to ensure short production cycles or uniform filling of the moulds.

It is well known that the stiffness of a heterophasic propylene copolymer can be increased by reducing the overall amount of the rubber phase. But following this approach, the impact properties are impaired.

Likewise, polymers with increased flowability are known to become stiffer. Such polymers however tend to become brittle and will more likely fail in impact testing.

It is further well known, that mechanical properties of a heterophasic propylene copolymer can be modified by varying the comonomer content of the dispersed elastomeric (rubber) phase:

An elastomeric propylene copolymer with low comonomer content (i.e. propylene rich) provides good optical behaviour in the sense of low haze, but is disadvantageous at low temperature impact test, e.g. at −20° C.

Accordingly, an elastomeric propylene copolymer with a high comonomer content will have a lower glass transition temperature and hence better impact behaviour at low temperatures, but will be less compatible in the embedding matrix of the heterophasic propylene copolymer, which will cause higher elastomer particle size, resulting in higher haze and limited toughness in biaxial impact tests.

In both cases (i.e. at high and low comonomer contents of the elastomeric propylene copolymer) the extractability of the elastomeric propylene copolymer will be significantly lower than with elastomeric propylene copolymers having a comonomer content of around 50 wt.-%.

So it becomes clear that improving a specific property in the context of stiffness/impact/compatibility/processing behaviour can only be accomplished on the expense of another property.

Especially in view of improving the impact behaviour at low temperatures it becomes clear, that this can be achieved only with improving the compatibility between a comonomer rich elastomeric rubber phases and the embedding matrix.

Accordingly it is the object of the present invention to provide a soft heterophasic random propylene copolymer with improved stiffness and impact behaviour and while maintaining optical properties, which is suitable as material for injection moulding, e.g. for thin walled injection moulded articles.

DESCRIPTION OF THE PRIOR ART

EP2891667 discloses a heterophasic propylene ethylene copolymer having an MFR2 of 0.5 to 100 g/10 min which is obtained using single site catalysis comprising: (i) a propylene homopolymer or propylene ethylene copolymer matrix having up to 4 wt.-% ethylene; and (ii) an ethylene propylene rubber (EPR) dispersed in the matrix; said heterophasic propylene ethylene copolymer having a xylene cold soluble content (XCS) of 20 to 40%; wherein the ethylene content of the xylene cold soluble fraction of said heterophasic propylene ethylene copolymer is between 70 and 90 wt.-%; wherein the xylene cold soluble fraction of said heterophasic propylene ethylene copolymer has an intrinsic viscosity (IV) of 3.0 dl/g or more; and wherein the melting enthalpy (Hm) of the heterophasic propylene ethylene copolymer is between 10 and 30 J/g at a temperature of 0 to 130° C.

EP2546298 discloses a heterophasic propylene copolymer comprising a matrix being a random propylene copolymer and an elastomeric propylene copolymer dispersed in said matrix. The heterophasic propylene copolymer has a comonomer content in the range of 10.0 to 15.0 wt.-%, a xylene cold soluble content in the range of 25 to 50 wt.-%, wherein further the xylene cold soluble content of the heterophasic propylene copolymer has a comonomer content in the range of 20 to 30 wt.-% and an intrinsic viscosity in the range of 0.8 to below 2.0 dl/g.

OBJECT OF THE INVENTION

The present invention is accordingly directed at multimodal random heterophasic polypropylene compositions with an improved compatibility between the matrix and a comonomer-rich elastomeric propylene copolymer embedded therein.

As a direct consequence of the improved compatibilization, the present invention is further directed to multimodal random heterophasic polypropylene compositions with improved stiffness and/or impact behaviour.

The present invention is also directed to multimodal random heterophasic polypropylene compositions with improved impact behaviour as determined by the Charpy Impact test as well as the biaxial impact behaviour.

In particular the present invention is directed to a multimodal random heterophasic polypropylene composition (m-Raheco) having improved biaxial impact behaviour at −20° C. as determined via the Puncture energy in the Instrumented Puncture Test (IPT) according to ISO6603.

The present invention is further directed at multimodal random heterophasic polypropylene compositions having simultaneously improved impact behaviour and improved stiffness.

Accordingly the present invention is also directed to multimodal random heterophasic polypropylene compositions having an improved mechanical performance index (MPI).

The present invention is further directed at multimodal random heterophasic polypropylene compositions combining high flowability, improved impact behaviour and simultaneously improved stiffness with good haze. Accordingly the present invention is directed to multimodal random heterophasic polypropylene compositions having improved opto-mechanical ability (OMA) or improved puncture based optomechanical abilities at +23° C. or −20° C.

In a further aspect of the invention, the present invention is directed at multimodal random heterophasic polypropylene compositions, which provide good impact behaviour at lower amounts of external rubber components than known from the art.

In still a further aspect of the invention, the present inventors have sought for ways, how to improve the compatibility of polymer components, which are as such incompatible or immiscible, but can be expected to give synergistic effects, when properly mixed with each other.

Accordingly, the present invention is directed to a compatibilizer which is suitable to improve mechanical properties of heterophasic propylene copolymers and its use.

Surprisingly the present inventors have now identified multimodal random heterophasic polypropylene composition (m-Raheco) with improved stiffness and impact behaviour maintaining the optical properties.

The present inventors have identified a way to produce a multimodal random heterophasic polypropylene composition (m-Raheco) with improved stiffness and impact behaviour while maintaining the optical properties.

Accordingly, the present inventors have identified a multimodal random heterophasic polypropylene composition (m-Raheco) having by a Melt Flow Rate (MFR230/2.16), determined according to ISO1133, of 1.0-100 g/10 min. and comprising a. 70.0-95.0 wt.-% of a first propylene random copolymer (P1) and b. 1.0-15.0 wt.-% of a second propylene random copolymer (P2) and c. 5.0-20.0 wt.-% of an elastomeric propylene copolymer (E)

wherein the multimodal random heterophasic polypropylene composition (m-Raheco) is characterised by having 17.0-32.0 wt.-% of a fraction soluble in cold xylene (XCS), wherein said fraction soluble in cold xylene (XCS) is characterised by:

a comonomer content Co(XCS) of 65.0-85.0 wt.-% and an intrinsic viscosity (IV) in the range of at least 2.5 dl/g when measured in Decalin according to ISO 1628.

In a special embodiment the invention covers articles made out of the multimodal random heterophasic polypropylene composition of the present invention, like injection moulded or extruded articles.

In further special embodiment the invention covers packaging articles comprising the multimodal random heterophasic polypropylene composition of the present invention.

In a further preferred embodiment, the invention covers the use of articles made out of the multimodal random heterophasic polypropylene composition of the present invention for packaging, alimentary or medical purposes.

In still a further alternative embodiment, the invention covers the use of propylene random copolymers as modifier in e.g. polyolefins, preferably in propylene copolymers. In still a further alternative embodiment the invention covers a process for producing said multimodal random heterophasic polypropylene composition of the present invention.

DETAILED DESCRIPTION

Multimodal Random Heterophasic Polypropylene Composition (m-Raheco)

The multimodal random heterophasic polypropylene composition (m-Raheco) according to this invention comprises a first propylene random copolymer (P1), a second propylene random copolymer (P2) and dispersed therein an elastomeric propylene copolymer (E). The first and the second propylene random copolymers together form a matrix which contains (finely) dispersed inclusions being not part of the matrix and said inclusions contain the elastomeric propylene copolymer (E). The term inclusion indicates that the matrix and the inclusion form different phases within the multimodal random heterophasic polypropylene composition (m-Raheco), said inclusions are for instance visible by high resolution microscopy, like electron microscopy or scanning force microscopy.

The multimodal random heterophasic polypropylene composition (m-Raheco) according to this invention comprises as polymer components only the first and the second propylene random copolymers (including optional subfractions) and the elastomeric propylene copolymer (E, including optional sub-fractions). In other words the multimodal random heterophasic polypropylene composition (m-Raheco) may contain further additives but no other polymer in an amount exceeding 5.0 wt.-%, more preferably exceeding 3.0 wt.-%, like exceeding 1.0 wt.-%, based on the total multimodal random heterophasic polypropylene composition (m-Raheco).

However, it is understood within the scope of this invention, that further polymers, especially being carriers for masterbatches, may be present in amounts up to 5.0 wt.-%. One additional polymer which may be present in such low amounts is a polyethylene which is a by-reaction product obtained by the preparation of heterophasic propylene random copolymer (m-RAHECO). Said polyethylene, being a crystalline polyethylene with a melting point in the range of 115 to 130° C. may be present in an amount of up to 3.0 wt.-% as visible by a related melting enthalpy of up to 2.0 J/g.

Accordingly it is in particular appreciated that the instant multimodal random heterophasic polypropylene composition (m-Raheco) contains, especially consists of only the first and the second propylene random copolymer (including optional subfractions), the elastomeric propylene copolymer (E, (including optional subfractions), additives in an amount not exceeding 5.0 wt.-% and optionally polyethylene in amounts as mentioned above.

The multimodal random heterophasic polypropylene composition (m-Raheco) according to this invention is featured by a moderate melt flow rate. Accordingly, the multimodal random heterophasic polypropylene composition (m-Raheco) has a melt flow rate MFR230/2.16 in the range of 1.0-100.0 g/10 min, preferably in the range of 5.0-75.0 g/10 min, more preferably in the range of 10.0-50.0 g/10 min.

Preferably it is desired that the multimodal random heterophasic polypropylene composition (m-Raheco) is thermo mechanically stable. Accordingly it is appreciated that the multimodal random heterophasic polypropylene composition (m-Raheco) has a melting temperature of at least 130° C., more preferably in the range of 130 to 165° C., still more preferably in the range of 135 to 160° C., such as in the range of 140 to 156° C. Typically the multimodal random heterophasic polypropylene composition (m-Raheco) has a rather low crystallization temperature, i.e. of not more than 120° C., more preferably in the range of 85 to 120° C., still more preferably in the range of 90 to 118° C.

The multimodal random heterophasic polypropylene composition (m-Raheco) comprises apart from propylene also comonomers. Preferably the multimodal random heterophasic polypropylene composition (m-Raheco) comprises apart from propylene ethylene and/or C4 to C12 α-olefins. Accordingly the term "propylene random copolymer" according to this invention is understood as a polypropylene comprising, preferably consisting of, units derivable from (a) propylene and (b) ethylene and/or C4 to C12 α-olefins.

Thus the multimodal random heterophasic polypropylene composition (m-Raheco) according to this invention, including the first and the second propylene random copolymer (P1 and P2) and the elastomeric propylene copolymer (E), comprise monomers copolymerisable with propylene, for example comonomers such as ethylene and/or C4 to C12 α-olefins, in particular ethylene and/or C4 to C8α-olefins, e.g. 1-butene and/or 1-hexene.

Preferably the propylene copolymers according to this invention comprise, especially consist of, monomers copolymerisable with propylene from the group consisting of ethylene, 1-butene and 1-hexene. More specifically the propylene copolymers of this invention comprise—apart from propylene—units derivable from ethylene and/or 1-butene. In a preferred embodiment the propylene copolymers according to this invention comprise units derivable from ethylene and propylene only. Still more preferably the multimodal random heterophasic polypropylene composition (m-Raheco) as well as the first and the second propylene random copolymer and the elastomeric propylene copolymer (E) contain the same comonomers, like ethylene.

Accordingly, the elastomeric propylene copolymer (E) is preferably an ethylene propylene rubber (EPR), whereas the first and the second propylene random copolymer (P1 and P2) are random ethylene propylene copolymers.

The multimodal random heterophasic polypropylene composition (m-Raheco) may be further characterised by a moderate total comonomer content. The total comonomer content of the multimodal random heterophasic polypropylene composition (m-Raheco) may be in the range of 14.0-24.0 wt.-%, like in the range of 15.0-23.0 wt.-%, such as 16.5-21.0 wt.-%.

The multimodal random heterophasic polypropylene composition (m-Raheco) is further characterised by a specific amount of a fraction being soluble in cold xylene (XCS) measured according to according ISO 16152 (25° C.).

Said xylene cold soluble fraction (XCS) forms 17.0-32.0 wt.-% of the multimodal random heterophasic polypropylene composition (m-Raheco), preferably in the range of 19.0-28.0 wt.-%, more preferably in the range of 21.0 to 25.0 wt.-%.

The fraction soluble in cold xylene (XCS) has a rather high total comonomer content which contributes to the softness of the material. Thus it is required that the comonomer content of fraction soluble in cold xylene (XCS) of the multimodal random heterophasic polypropylene composition (m-Raheco) is in the range of 65.0-85.0 wt.-%, like 68.0-81.0 wt.-%, more preferably in the range of 70.0-78.0 wt.-%.

The comonomers present in the xylene cold soluble (XCS) fraction are those defined above for the multimodal random heterophasic polypropylene composition (m-Raheco) above and the elastomeric propylene copolymer (E), respectively. In one preferred embodiment the comonomer is ethylene only.

Further it is appreciated that the xylene cold soluble (XCS) fraction of the multimodal random heterophasic polypropylene composition (m-Raheco) is specified by its intrinsic viscosity. Low intrinsic viscosity (IV) values reflect a low weight average molecular weight. For the present invention it is required that the xylene cold soluble fraction (XCS) of the multimodal random heterophasic polypropylene composition (m-Raheco) has an intrinsic viscosity (IV) measured according to ISO 1628/1 (at 135° C. in decalin) of at least 2.5 dl/g, more preferably of in the range of 2.5 to 4.5 dl/g, still more preferably in the range of 2.7 to 3.9 dl/g, still yet more preferably in the range of 2.8 to 3.4 dl/g.

The multimodal random heterophasic polypropylene composition (m-Raheco) can be further characterised by the presence of at least two or more glass transition temperatures (Tg1 and Tg2), optionally by at least three glass transition temperatures like Tg1, Tg2 and Tg3 or more.

The two lower glass transition temperatures (Tg1 and Tg2) relate to the dispersed elastomeric propylene copolymer (E) wherein the higher glass transition temperature(s) (Tg3 or further) relate to the matrix of the multimodal random heterophasic polypropylene composition (m-Raheco) formed by the first or preferably the second propylene random copolymer (P1 and P2) or subfractions thereof.

The person skilled is aware that low glass transition temperatures are beneficial for good impact behaviour at temperatures below 0° C., e.g. Puncture energy at −20° C. as determined by the instrumented falling weight test according to ISO 6603-2.

Accordingly, the multimodal random heterophasic polypropylene composition (m-Raheco) of the present invention is preferably characterised by at least two glass transition temperatures Tg1 and Tg2 of below 0° C.

It is further preferred, that the difference between the two lowest glass transition temperatures is at least 10 K, like at least 12 K, such as at least 13 K.

In case the multimodal random heterophasic polypropylene composition (m-Raheco) is characterised by three or more glass transition temperatures, it is preferred that at least three of said glass transition temperatures being below 10° C., preferably equal or below 4° C.

It is equally preferred, that in the case the multimodal random heterophasic polypropylene composition (m-Raheco) is characterised by three or more glass transition temperatures, at least two of said glass transition temperatures are equal or below 0° C., like equal or below (−10) ° C., like equal or below (−25) ° C., like equal or below (−40) ° C. It is further preferred, that the difference between the two lowest glass transition temperatures is at least 10 K, like at least 12 K, such as at least 13 K.

Preferably, the lowest glass transition temperature (Tg1) may be in a range of (−75) ° C. to (−55) ° C., like (−72) to (−58), such as (−70) ° C. to (−60) ° C.

The second-lowest glass transition temperature (Tg2) may be in a range of (−55) ° C. to (−35) ° C., such as in a range of (−52) ° C. to (−37) ° C., like (−50° C. to (−40) ° C.

The third-lowest glass transition temperature (Tg3) may be in a range of (−15) ° C. to (+5) ° C., like (−12) ° C. to (−1) ° C., such as (−10) ° C. to (−3) ° C.

First Propylene Random Copolymer (P1)

The first propylene random copolymer (P1) as comprised by the multimodal random heterophasic polypropylene composition (m-Raheco) is a random propylene copolymer.

The multimodal random heterophasic polypropylene composition (m-Raheco) can comprise 70.0-95.0 wt.-%, preferably 70.0 to 94.0 wt.-% of the first propylene random copolymer (P1), ideally it comprises 72.0-90.0 wt.-%, such as 76.0-87.0 wt.-% based on the total weight of the multimodal random heterophasic polypropylene composition (m-Raheco).

The comonomers present in the first propylene copolymer are those defined above for the multimodal random heterophasic polypropylene composition (m-Raheco) above and the elastomeric propylene copolymer (E), respectively. In one preferred embodiment the comonomer is ethylene only.

The comonomer content in first propylene random copolymer (P1) is rather low, 2.5 wt.-% or less, preferably 2.0 wt.-% or less, more preferably 1.8 wt.-% or less, ideally 1.5 wt.-% or less.

Ideally, the comonomer content in first propylene random copolymer (P1) is in the range of 0.3-2.5 wt.-%, like 0.5-2.0 wt.-%, such as 0.8-1.8 wt.-%.

The glass transition temperature of first propylene random copolymer (P1) may be above in the range of (−2) to +6° C., such as in the range of 0 to +4° C.

The first propylene random copolymer (P1) is characterized by a good flowability in the sense of a high melt flow rate MFR230/2.16. The MFR may be in the range of 1.0-500 g/10 min, preferably in the range of 20.0-300.0 g/10 min, such as in the range of 50.0-200 g/10 min or 70.0-150 g/10 min.

The xylene cold soluble (XCS) fraction of the first propylene random copolymer (P1) measured according to according ISO 16152 (25° C.) is low, such as 4.5 wt.-% or less, preferably 4.0 wt.-% or less, more preferably 3.5 wt.-% or less Preferably the fraction soluble in cold xylene (XCS) of the first propylene random copolymer (P1) is in the range of 1.0-4.5 wt.-%, like 2.0-4.0 wt.-%, such as 2.5-3.5 wt.-%.

The first propylene random copolymer (P1) may be produced by any known conventional polymerization technologies and based on various catalyst technologies, like Ziegler-Natta or metallocene-based catalysts.

In a preferred embodiment however, the first propylene random copolymer (P1) may be polymerized in the presence of metallocene based catalyst.

The molecular weight distribution of the first propylene random copolymer (P1) is preferably narrow, like 4.5 or lower, such as 3.5 or lower, like 3.0 or below.

Second Propylene Random Copolymer (P2)

The second propylene random copolymer (P2) as comprised by the multimodal random heterophasic polypropylene composition (m-Raheco) is a random propylene copolymer. Preferably, the second propylene random copolymer (P2) differs from the first propylene random copolymer (P1) in at least one aspect, like MFR, comonomer content, the amount fraction soluble in cold xylene (XCS) or the intrinsic viscosity of said fraction soluble in cold xylene (XCS).

It may further differ in view of the polymerisation technologies and the according catalyst system used.

The multimodal random heterophasic polypropylene composition (m-Raheco) can comprise up to 15.0 wt.-% of the second propylene random copolymer (P2), ideally it comprises 1.0-15.0 wt.-%, like 1.5-10.0 wt.-%, such as 2.0-8.0 wt.-% based on the total weight of the multimodal random heterophasic polypropylene composition (m-Raheco).

The second propylene random copolymer (P2) comprises—apart from propylene—also comonomers. Preferably the second propylene random copolymer (P2) comprises apart from propylene ethylene and/or C4 to C12 α-olefins. Accordingly the term "propylene random copolymer" according to this invention is understood as a polypropylene comprising, preferably consisting of, units derivable from (a) propylene and (b) ethylene and/or C4 to C12 α-olefins.

The comonomers present in the second propylene random copolymer (P2) are those defined above for the multimodal random heterophasic polypropylene composition (m-Raheco). In one preferred embodiment the comonomer is ethylene only.

The second propylene random copolymer (P2) may be produced by any known conventional polymerisation technologies and based on various catalyst technologies, like Ziegler-Natta or metallocene-based catalysts.

In a preferred embodiment however, the second propylene random copolymer (P2) may be polymerised in the presence of Ziegler-Natta catalyst system.

The second propylene random copolymer (P2) is featured by a lower flowability than the first propylene random copolymer (P1) in the sense of lower MFR value. Preferably, the MFR values of the second propylene random copolymer (P2) are at most 50.0 g/10 min. The MFR230/2.16 of the second propylene random copolymer (P2) may be in the range of 0.1-50.0 g/10 min, like 0.3-30 g/10 min, such as 0.5-15.0 g/10 min.

The second propylene random copolymer (P2) is further featured by both a higher comonomer content and a higher amount of fraction soluble in cold xylene (XCS) than the first propylene copolymer.

The comonomer content of the second propylene random copolymer fraction (P2) can be in the range of 4.0-15 wt.-%, preferably in the range of 4.5-13.0 wt.-%, more preferably in the range of 5.5-11.0 wt.-%.

The xylene cold soluble (XCS) fraction measured according to according ISO 16152 (25° C.) of the second propylene random copolymer (P2) may be in the range of 10.0-34.0 wt.-%, preferably in the range of 13.0-30.0 wt.-%, more preferably in the range of 15.0-26.0 wt.-%.

It is especially preferred, that second propylene random copolymer (P2) is characterised by a comonomer content of 4.0-15 wt.-% and a fraction soluble in cold xylene of 10.0-34.0 wt.-%.

The second propylene random copolymer (P2) may be characterised by a glass transition temperature (Tg) of below 0° C.

Alternatively, the second propylene random copolymer (P2) may be characterised by a glass transition temperature within the range of (−15) ° C. to (+5) ° C., like (−12) ° C. to (−1) ° C., such as (−10) ° C. to (−3° C.).

Use of Propylene Random Copolymer (P2) as Modifier

The present inventors have shown that, by combining two specific random copolymers with elastomer(s), the final mixtures (i.e. the inventive examples of the present invention) are characterized by higher stiffness than each of the starting polymers.

Furthermore, the stiffness of the final polymer (i.e. the inventive examples of the present invention) is higher, than any conventional mixing rule would suggest.

It was further observed, that impact strength, like Charpy Impact test as well as the biaxial impact behaviour improved.

It was further observed, that especially impact behaviour at −20° C., in particular biaxial impact behaviour at −20° C. as determined according to ISO 6603 were improved.

Without being bound to any theory, the present inventors attribute this effect to the fact that the second propylene random copolymer (P2) as described herein works as a modifier, preferably as compatibilizer between the matrix formed by the propylene random copolymer (P1) and the comonomer rich elastomeric propylene copolymer (E).

Furthermore, the second propylene random copolymer (P2) is considered to work as a modifier, preferably as a compatibilizer, also between the first and second elastomeric propylene copolymer (E1+E2) as described later.

In detail, the present inventors regard the specific combination of a high comonomer content of the second propylene random copolymer (P2) and a high amount of fraction soluble in cold xylene (XCS) essential to achieve the surprising modifying or compatibilizing effect.

The second propylene random copolymer (P2) as modifier can be introduced as such. Alternatively, it can be introduced comprised by a heterophasic propylene copolymer (e.g. Heco 2, where it may form the matrix).

Accordingly, the present inventors have identified that a propylene random copolymers characterised by a comonomer content of 4.0-15.0 wt.-% and 10.0-34 wt.-% of a fraction soluble in cold xylene are especially suitable as modifiers, preferably compatibilizers.

The second propylene random copolymer (P2) working as a modifier corresponds to the polymer as available after the Loop and GPR1-polymerisation as described for Heco 2.

Such modifiers are considered especially suitable in polyolefins, like in polyethylene or polypropylene based polymers or copolymers.

Such modifiers, preferably compatibilizers are especially useful in heterophasic propylene copolymers or heterophasic random copolymers.

So the present inventors propose the use of propylene random copolymers for improving the mechanical properties, especially stiffness and/or impact behaviour, in polyolefins, preferably in polyethylene or polypropylene based polymers or copolymers, in particular in heterophasic propylene copolymers or heterophasic random copolymers.

The propylene random copolymers to be used as or in modifiers or compatibilizers may be characterised by a comonomer content in the range of 4.0-15.0 wt.-%, preferably in the range of 4.5-13.0 wt.-%, more preferably in the range of 5.5-11.0 wt.-%.

The propylene random copolymers to be used as or in modifiers or compatibilizers may be also characterised by a xylene cold soluble (XCS) fraction of in the range of 10.0-34.0 wt.-%, preferably in the range of 13.0-32.0 wt.-%, more preferably in the range of 15.0-29.0 wt.-%.

In a preferred embodiment, propylene random copolymers suitable as modifiers or compatibilizers in polyolefins are characterised by a comonomer content of 5.0-15.0 wt.-%, preferably in the range of 6.5-13.0 wt.-%, still more preferably in the range of 7.5-11.0 wt.-% and a xylene cold soluble (XCS) fraction of 20.0-34.0 wt.-%, preferably in the range of 22.0-32.0 wt.-%, still more preferably in the range of 23.0-29.0 wt.-%.

This preferred embodiment of the compatibilizer corresponds to the polymer as produced in the GPR1 of Heco 2.

The present inventors have also identified compatibilizers comprising a propylene random copolymer characterised by a comonomer content in the range of 4.0-15.0 wt.-% and 10.0-34.0 wt.-% of a fraction soluble in cold xylene.

In a preferred embodiment the compatibilizers comprise propylene random copolymers characterised by a comonomer content of 5.0-15.0 wt.-% and a fraction soluble in cold xylene (XCS) of 20.0-34.0 wt.-%.

Elastomeric Propylene Copolymer (E)

A further component of the multimodal random heterophasic propylene composition (m-Raheco) is the elastomeric propylene copolymer (E) which is dispersed in the matrix formed by the first and the second propylene random copolymer (P1 and P2).

Concerning the comonomers used in the elastomeric propylene copolymer (E) it is referred to the information provided for the multimodal random heterophasic polypropylene composition (m-Raheco).

Accordingly the elastomeric propylene copolymer (E) comprises monomers copolymerisable with propylene, for example comonomers such as ethylene and/or C4 to C12 α-olefins, in particular ethylene and/or C4 to C8 α-olefins, e.g. 1-butene and/or 1-hexene. Preferably the elastomeric propylene copolymer (E) comprises, especially consists of, monomers copolymerisable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises, preferably consists of units derivable from ethylene and propylene only.

The comonomer content of the elastomeric propylene copolymer (E) is rather high, namely in the range of 65.0-85.0 wt.-%, preferably in the range of 68.0-81.0 wt.-%, more preferably in the range of 70.0-78.0 wt.-%.

The comonomers present in the elastomeric propylene copolymer (E) are those defined above for the multimodal random heterophasic polypropylene composition (m-Raheco). In one preferred embodiment the comonomer is ethylene only.

In a preferred embodiment, the elastomeric propylene copolymer (E) comprises a first elastomeric propylene copolymer (E1) and a second elastomeric propylene copolymer (E2).

Preferably, the first elastomeric propylene copolymer (E1) may form 8.0-16.0 wt.-% of the total multimodal random heterophasic polypropylene composition (m-Raheco). More preferably, the first elastomeric propylene copolymer (E1)

may form 9.0-15.0 wt.-%, like 10.0-14.0 wt.-% of the total multimodal random heterophasic polypropylene composition (m-Raheco).

Equally preferred is that the second elastomeric propylene copolymer (E2) forms about 0.1-5.0 wt.-% of the total multimodal random heterophasic polypropylene composition (m-Raheco).

More preferably, the second elastomeric propylene copolymer (E2) forms about 0.3-3.5 wt.-% or 0.5-2.5 wt.-% of the total multimodal random heterophasic polypropylene composition (m-Raheco).

Said two elastomeric propylene copolymers (E1+E2) may be present in ratios of E1 to E2 in the range of 30:1 to 3:1, like 25:1 to 4.5:1, such as preferably 20:1 to 6:1.

These two elastomeric propylene copolymers (E1 and E2) may differ in view of their comonomer content, their respective glass transition temperatures (Tg1 and Tg2), in view of their intrinsic viscosities and/or in view of their respective molecular weight distributions (MWD).

Preferably, they differ in view of their intrinsic viscosities (IV) and/or in view of their comonomer content (Co(XCS)).

Equally preferred is that one of the two elastomeric propylene copolymers (E1 or E2) is characterized by a higher comonomer content and/or a higher viscosity than the other.

Accordingly, one of the two elastomeric propylene copolymers is characterised by
   an intrinsic viscosity (IV) in the range of 2.6-4.5 and/or
   a comonomer content Co(XCS) of 62.0-85.0 wt.-%.

Preferably, one of the two elastomeric propylene copolymers (E1 or E2) is characterized by a lower comonomer content and a lower intrinsic viscosity.

Accordingly, one of the two elastomeric propylene copolymers is characterised by
   an intrinsic viscosity (IV) in the range of 1.2 to 2.5 dl/g and/or
   a comonomer content Co(XCS) of 18.0-33.0 wt.-%.

It is further preferred, that one of the two elastomeric propylene copolymers is characterised by
   an intrinsic viscosity (IV) in the range of 2.6-4.5 and
   a comonomer content Co(XCS) of 62.0-85.0 wt.-% and
the other elastomeric propylene copolymer is—independently of the earlier—characterised by
   an intrinsic viscosity (IV) in the range of at 1.2-2.5 dl/g and
   a comonomer content Co(XCS) of 18.0-33.0.

Preferably, the first elastomeric propylene copolymer (E1) has a higher comonomer content and a higher intrinsic viscosity, than the second elastomeric propylene copolymer (E2).

Furthermore, first elastomeric propylene copolymer (E1) may have a comonomer content in the range of 62.0-85.0 wt.-% like 65.0-82.0 wt.-%, such as 68.0-80.0 wt.-%. The intrinsic viscosity (IV) of the first elastomeric propylene copolymer (E1) may be in the range of 2.6-4.5 dl/g, like 2.7-3.9 dl/g, such as 2.8-3.4 dl/g.

Furthermore, second elastomeric propylene copolymer (E2) may have a comonomer content in the range of 18.0-33.0 wt.-%, like 21.0-30.0 wt.-%, such as 23.0-28.0 wt.-%.

The intrinsic viscosity (IV) of the second elastomeric propylene copolymer (E2) may be 2.5 dl/g or below, like in the range of 1.2-2.5 dl/g, such as 1.5-2.4 dl/g, like 1.8-2.3 dl/g.

It is further preferred, that the two different elastomeric propylene copolymers (E1 and E2) show two distinct (different) glass transition temperatures Tg1 and Tg2.

The person skilled will be aware, that the elastomeric propylene copolymer with a higher comonomer content will have a lower glass transition temperature, whereas the elastomeric propylene copolymer comprising less comonomers will have a higher glass transition temperature.

It is understood within this invention, that the first elastomeric propylene copolymer (E1) is characterized by a first glass transition temperature (Tg1), and the second elastomeric propylene copolymer (E2) is characterized by a second glass transition temperature Tg2.

It is further understood within this invention that the first glass transition temperature (Tg1) is lower than the second glass transition temperature (Tg2).

Both of said glass transition temperatures may be below 0° C., preferably equal or below (−3) ° C. like equal or below (−10) ° C., like equal or below (−25) ° C., like equal or below (−40) ° C.

It is further preferred, that the difference between these two glass transition temperatures is at least 10 K, like at least 12 K, such as at least 13 K.

Preferably, the lowest glass transition temperature may be in a range of (−75) ° C. to (−55) ° C., like (−72) to (−58), such as (−70) ° C. to (−60) ° C. The second-lowest glass transition temperature may be in a range of (−55) ° C. to (−35) ° C., such as in a range of (−52) ° C. to (−37) ° C., like (−50) ° C. to (−40) ° C.

The elastomeric propylene copolymer (E) as well as the first and the second elastomeric propylene copolymers (E1+E2) may be produced by any known conventional polymerisation technologies and based on various catalyst technologies, like Ziegler-Natta or metallocene-based catalysts.

In a preferred embodiment however, the first elastomeric propylene copolymer (E1) is produced in the presence of a single site catalyst system and the second elastomeric propylene copolymer (E2) is produced in the presence of a Ziegler-Natta catalyst system.

It is envisaged within the present invention, that the first and the second elastomeric propylene copolymer (E1+E2) differ in view of their molecular weight distribution (MWD). The molecular weight distribution is understood as the ratio between weight and numeric average molecular weight (Mw/Mn) of the respective elastomeric propylene copolymer (E1+E2).

Preferably one of the first and the second elastomeric propylene copolymer (E1+E2) is characterised by a MWD of at least 4.0 or higher, like in the range of 4.0-8.0, like 4.4 to 7.0 such as 4.8-6.0. The other elastomeric propylene copolymer is characterised by a MWD of at most 3.8 or lower, like in the range 1.0-3.8, preferably 1.5-3.4, especially 2.0-3.0.

Accordingly, in a special embodiment one of the two elastomeric propylene copolymers is characterised by
   an intrinsic viscosity (IV) in the range of 2.6-4.5 and/or
   a comonomer content Co(XCS) of 62.0-85.0 wt.-% and/or
   a molecular weight distribution (MWD) of at most 3.8 and/or
   a glass transition temperature (Tg1) of in the range of (−75) ° C. to (−55) ° C.

In a similarly preferred embodiment the other elastomeric propylene copolymer is—independent from the other elastomeric propylene copolymer—characterised by
   an intrinsic viscosity (IV) in the range of at most 2.5 dl/g and/or
   a comonomer content Co(XCS) of 18.0-33.0 wt.-% and/or
   a molecular weight distribution (MWD) of at least 4.0 or more and/or a glass transition temperature (Tg1) of in the range of (−55) ° C. to (−35) ° C.

In a further preferred special embodiment one of the two elastomeric propylene copolymers is characterised by
an intrinsic viscosity (IV) in the range of 2.6-4.5 and
a comonomer content Co(XCS) of 62.0-85.0 wt.-% and
a molecular weight distribution of at most 3.8 and
a glass transition temperature (Tg1) of in the range of (−75) ° C. to (−55) ° C.

In a similarly preferred embodiment the other elastomeric propylene copolymer is—independently from the earlier elastomeric propylene copolymer—characterised by
an intrinsic viscosity (IV) in the range of at most 2.5 dl/g and
a comonomer content Co(XCS) of 18.0-33.0 wt.-% and
a molecular weight distribution of at least 4.0 or more and.
a glass transition temperature (Tg1) of in the range of (−55) ° C. to (−35) ° C.

Mechanical Properties

The multimodal random heterophasic polypropylene composition (m-Raheco) of the present invention is characterized by a specific relation of mechanical properties and shows improvement in tensile, optical and impact properties, both at +23° C. and −20° C.

The multimodal random heterophasic polypropylene composition (m-Raheco) is featured by a higher stiffness than the respective starting components.

Accordingly, the tensile modulus according to ISO 527 of the multimodal random heterophasic polypropylene composition (m-Raheco) of the present invention may be at least at least 750 MPa or more, like 800 MPa or more, like 815 MPa or more. A suitable upper limit for the tensile modulus can be 1500 or below, like 1200 or 1000 MPa.

Likewise, the multimodal random heterophasic polypropylene composition (m-Raheco) is characterized by a better impact behaviour.

The impact behaviour of the multimodal random heterophasic polypropylene composition (m-Raheco) of the present invention is especially advantageous at temperatures below 0° C., namely by at −20° C. as determined via the Puncture Energy at −20° C. in the instrumented puncture test according to ISO 6603.

The puncture energy determined according to ISO 6603 at +23° C. may be at least 9.0 J or more, like 11.0 J or more or 13.5 J or more. A reasonable upper limit for the puncture energy determined according to ISO 6603 at +23° C. is 50.0 J.

The puncture energy determined according to ISO 6603 at −20° C. may be at least 2.5 J or more, like 3.0 J or more or 3.5 J or more. A reasonable upper limit for the puncture energy determined according to ISO 6603 at +23° C. is 15.0 J, such as up to 10.0 J.

The multimodal random heterophasic polypropylene composition (m-Raheco) may also be characterized by a Charpy notched Impact strength (NIS, ISO 179 1eA determined at 23° C.) of at least 4.0 kJ/m$^2$ or more, like 4.5 kJ/m$^2$, or more, such as 4.8 kJ/m$^2$ or more. A reasonable upper limit for the Charpy notched Impact strength (NIS, ISO 179 1 eA determined at 23° C.) is 25.0 kJ/m$^2$, like up to 20.0 kJ/m$^2$ The multimodal random heterophasic polypropylene composition (m-Raheco) may be characterised by an improved Mechanical Performance index (MPI).

The mechanical performance index (MPI) equals the product of tensile modulus (ISO527) [MPa] multiplied with Charpy notched Impact Strength at +23° C. [kJ/m$^2$] (both determined on injection moulded specimen) and divided by the Meltflow Rate 230/2.16 [g/10 min]:

$$MPI = \frac{\text{tensile modulus [MPa]} * NIS \, [kJ/m^2]}{MFR230 / 2.16 \, [g/10 \text{ min}]} \quad (I)$$

The MPI of the multimodal random heterophasic polypropylene composition (m-Raheco) of the present invention may be at least 100 or more, such as at least 120 or more, like at least 140 or more.

Suitable upper limits for the MPI are about 500 or below, such as 400 or below, like 300 or below.

The multimodal random heterophasic polypropylene composition (m-Raheco) may be further characterised by a well pronounced optomechanical ability (OMA). The opto mechanical ability (OMA) is the product of tensile modulus and Charpy notched impact strength, divided by value for Haze on 1 mm thick injection moulded plaques (Haze$_1$) as determined according to ASTM 1003 D:

$$OMA = \frac{\text{tensile modulus [MPa]} * NIS \left[\frac{kJ}{m^2}\right]}{Haze_1 \, [\%]} \quad (II)$$

The OMA of the multimodal random heterophasic polypropylene composition (m-Raheco) of the present invention may be at least 40 or more, like 50 or more, such as 55 or more. Suitable upper limits for the OMA are about 300 or below, such as 250 or below, like 200 or below.

The multimodal random heterophasic polypropylene composition (m-Raheco) is especially advantageous in view of the puncture based optomechanical ability determined at +23° C. (punc-Oma +23) and at −20° C. (punc-OMA −20).

The punc-OMA value is the product of tensile modulus and the puncture energy (determined at +23 or −20° C. respectively), divided by the Haze$_1$ mm.

The puncture based optomechanical ability punc-OMA +23° C. is determined according the formula given below:

$$punc\text{-}OMA + 23 = \frac{\text{tensile modulus [MPa]} * (\text{Puncture Energy} + 23° C.) \, [J]}{Haze_1 \, [\%]} \quad (III)$$

The puncture based optomechanical ability punc-OMA −20° C. is determined according the formula given below:

$$punc\text{-}OMA - 20 = \frac{\text{tensile modulus [MPa]} * (\text{Puncture Energy} - 20° C.) \, [J]}{Haze_1 \, [\%]} \quad (IV)$$

The punc-OMA +23 may be at least 80 or more, like 120 or more, such as 150 or more. The punc-OMA −20 may be at least 40 or more, like 50 or more, such as 60 or more. Suitable upper limits for the punc-OMA +23 are 500 or below, such as 450 or below, like 400 or below.

Suitable upper limits for the punc-OMA −20 are 300 or below, such as 250 or below, like 200 or below.

The multimodal random heterophasic polypropylene composition (m-Raheco) of the present invention is preferably characterized by a tensile modulus of at least 750 MPa and either or both of a Charpy notched Impact strength +23 (NIS) of at least 9.0 J and/or a optomechancial ability (OMA) of at least 40 or more.

The multimodal random heterophasic polypropylene composition (m-Raheco) of the present invention is preferably characterized by a tensile modulus of at least 750 MPa and either or both of a punc-OMA +23 at least 80 or more and/or a punc-OMA −20 of at least 40 or more.

Articles and Uses:

In special embodiment the present invention envisages injection moulded articles, e.g. packaging articles made out of the multimodal random heterophasic polypropylene composition (m-Raheco) of the present invention. Alternatively preferred are articles for packing alimentary or medical goods.

In a further special embodiment the present invention envisages articles like packaging articles comprising injection moulded articles comprising the multimodal random heterophasic polypropylene composition (m-Raheco) of the present invention.

In a further special embodiment the present invention envisages extruded articles, e.g. films, sheets, e.g. sheets for thermoforming processes, tapes, bags or pouches made out of the multimodal random heterophasic polypropylene composition (m-Raheco) of the present invention.

In still a further special embodiment the present invention envisages articles like packaging articles comprising extruded articles comprising the multimodal random heterophasic polypropylene composition (m-Raheco) of the present invention.

In a further special embodiment the present invention envisages the use of the multimodal random heterophasic polypropylene composition (m-Raheco) of the present invention for producing injection moulded or extruded articles. Especially preferred are packaging articles like ampoules, lids, cups, beakers, trays, etc.

Alternatively, the present invention envisages the use of the multimodal random heterophasic polypropylene composition (m-Raheco) of the present invention for producing packaging articles.

In another further special embodiment the present invention envisages the use of such articles comprising the multimodal random heterophasic polypropylene composition (m-Raheco) of the present invention for packaging or thermoforming processes, preferably for producing alimentary or medical packaging.

In another further special embodiment the present invention envisages the use of such extruded articles comprising the multimodal random heterophasic polypropylene composition (m-Raheco) of the present invention for producing packaging articles, like packaging articles used for alimentary or medical applications.

In a preferred embodiment, the present invention envisages squeezable articles, like squeezable ampoules, squeezable tubes or collapsible tubes as used for cremes, toothpaste, etc.

Process

The multimodal random heterophasic polypropylene composition (m-Raheco) of the present invention may be produced by sequential polymerisation of the various fractions in a suitable order.

In a further alternative embodiment, the multimodal random heterophasic polypropylene composition (m-Raheco) can be produced by compounding two or more distinct polymers, which by themselves have been produced by any conventional, polymersation method, e.g. in sequential order.

Alternatively, the multimodal random heterophasic polypropylene composition (m-Raheco) of the present invention can be produced by mixing (compounding) the first propylene random copolymer (P1), the second propylene random copolymer (P2) and the elastomeric propylene copolymer (E) or any potential subfractions thereof. The person skilled is aware of such suitable compound technologies, e.g. co- or counterroating twin screw extruders, Buss-kneaders and the like.

In a preferred embodiment, the multimodal random heterophasic polypropylene composition (m-Raheco) of the present invention is produced by mixing a first and a second heterophasic propylene copolymer ((Heco 1) and (Heco 2)).

Each of these first and a second heterophasic propylene copolymers (Heco 1) and (Heco 2) comprises a propylene random copolymer (P1 or P2) and an elastomeric propylene copolymer (E1 or E2) as defined herein dispersed in said propylene random copolymer (P1 or P2).

The first heterophasic propylene copolymer (Heco 1) may comprises a first propylene random copolymer (P1), (optionally including any potential subfractions), as a first matrix (PM1) and the a elastomeric propylene copolymer (E1) dispersed therein.

The second heterophasic propylene copolymer (Heco 2) may comprise a second propylene random copolymer (P2, optionally including any potential subfractions) as a second matrix (PM2) and a second elastomeric propylene copolymer (E2) dispersed therein.

The first heterophasic propylene copolymer (Heco 1) may comprise 81.0-93.0 wt.-% of the first propylene random copolymer (P1), like 83.0-91.0 wt.-% or 85.0-89.0 wt.-%. Accordingly, the first propylene random copolymer (P1) may comprise 7.0-19.0 wt.-% of the first elastomeric propylene copolymer (E1), like between 9.0-17.0 wt.-%, such as 11.0-15.0 wt.-% of the first elastomeric propylene copolymer (E1).

The first propylene random copolymer (P1) as comprised by the first heterophasic propylene copolymer (Heco 1) may further comprise any subfractions.

The second heterophasic propylene copolymer (Heco 2) may comprise between 72.0-82.0 wt.-% of the second propylene random copolymer (P2), preferably between 74.0-81.0 wt.-%, such as between 75.0-80.0 wt.-%.

Accordingly, the second heterophasic propylene copolymer (Heco 2) may comprise between 18.0-28.0 wt.-% of the second elastomeric propylene copolymer (E2), such as between 19.0-27.0 wt.-%, like between 21.0-25.0 wt.-%.

The second propylene random copolymer (P2 as comprised by the second heterophasic propylene copolymer (Heco 2) may further comprise any subfractions (P2-F1 and/or P2-F2) as defined herein.

In a preferred embodiment, the multimodal random heterophasic polypropylene composition (m-Raheco) of the present invention comprises 85.0-99.0 wt.-% of the first heterophasic propylene copolymer (Heco 1) and 1.0-15.0 wt.-% of the second heterophasic propylene copolymer (Heco 2).

Preferably, the first heterophasic propylene copolymer (Heco 1) may be present in the multimodal random heterophasic polypropylene composition (m-Raheco) in amounts of 85.0-99.0 wt.-%, such as 90.0 to 98.5 wt.-% or 92.0-98.0 wt.-%.

Accordingly, the second heterophasic propylene copolymer (Heco 2) may be present in the multimodal random heterophasic polypropylene composition (m-Raheco) of the present invention in amounts of 1.0 to 15.0 wt.-%, like 1.5-10.0 wt.-% such as 2.0-8.0 wt.-%.

In a preferred embodiment, the multimodal random heterophasic polypropylene composition (m-Raheco) of the present invention comprises
a) 85.0-99.0 wt.-% of the first heterophasic propylene copolymer (Heco 1), further comprising
    81.0-93.0 wt.-% of a first propylene random copolymer (P1) and
    7.0-19.0 wt.-% of first elastomeric propylene copolymer (E1) and
b) 1.0-15.0 wt.-% of the second heterophasic propylene copolymer (Heco 2), further comprising
    72.0-82.0 wt.-% of a second propylene random copolymer (P2)
    18.0-28.0 wt.-% of second elastomeric propylene copolymer (E2)

Both the first and the second heterophasic propylene copolymer ((Heco 1) and (Heco 2)) may be produced—independently of each other—by any known conventional polymerisation technologies and based on various catalyst technologies, like Ziegler-Natta or metallocene-based catalysts.

In a preferred embodiment however, the first heterophasic propylene copolymer (Heco 1) may be produced in the presence of a single site catalyst system. Alternatively and independently of the HECO 1, the second heterophasic propylene copolymer (Heco 2) may produced in the presence of a Ziegler-Natta catalyst system.

Each of said first and second heterophasic propylene copolymers (Heco 1+2) may preferably be produced by sequential polymerisation comprising the steps of:
(a) polymerising in a first reactor propylene and optionally ethylene and/or C4 to C12 α-olefin obtaining thereby a first propylene homo- or random copolymer fraction F1
(b) transferring said first propylene homo- or random copolymer fraction (F1) in a second reactor,
(c) polymerising in said second reactor in the presence of the first propylene homo- or random copolymer fraction (F1) propylene and ethylene and/or C4 to C12 α-olefin and obtaining a second propylene random copolymer fraction (F2), said first propylene homo- or copolymer fraction (F1) and said second propylene random copolymer fraction (F2) form the matrix (PM),
(d) transferring said matrix (PM) into a third reactor,
(e) polymerising in said third reactor in the presence of the matrix (PM) propylene and ethylene and/or C4 to C12 α-olefin obtaining an elastomeric propylene copolymer (E), said matrix (PM) and said elastomeric propylene copolymer (E) form then the first and the second heterophasic propylene copolymers (HECO 1 and HECO 2)

For preferred embodiments of the first and the second propylene random copolymers (P1 and P2), their respective first or second propylene copolymer fraction (F1 or F2), or the elastomeric propylene copolymer (E) reference is made to the definitions given above.

The term "sequential polymerisation process" indicates that the first or second heterophasic propylene copolymer (Heco 1 or Heco 2) are produced in at least two, like three, reactors connected in series. Accordingly the present process comprises at least a first reactor, a second reactor, and optionally a third reactor. The term "polymerisation process" shall indicate that the main polymerisation takes place. Thus in case the process consists of three polymerisation reactors, this definition does not exclude the option that the overall process comprises for instance a pre-polymerisation step in a pre-polymerisation reactor. The term "consist of" is only a closing formulation in view of the main polymerisation process.

The first reactor is preferably a slurry reactor and can be any continuous or simple stirred batch tank reactor or loop reactor operating in bulk or slurry. Bulk means a polymerisation in a reaction medium that comprises of at least 60 wt.-% monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor (R3) are gas phase reactors (GPR). Accordingly for the instant process at least three, preferably three polymerisation reactors, namely a slurry reactor, like loop reactor, a first gas phase reactor and a second gas phase reactor are connected in series are used. If needed prior to the slurry reactor a pre-polymerisation reactor is placed.

A preferred multistage process is a "loop-gas phase"-process, such as developed by *Borealis* NS, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol<®> process of Basell.

The present invention will now be described in further detail by the examples provided below:

Examples

Measuring Methods
Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Density

Density is measured according to ISO 1183. Sample preparation is done by compression moulding in accordance with ISO 1873.

Xylene Soluble Fraction and Amorphous Phase

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached.

The xylene soluble fraction (percent) can then be determined as follows:

$$XCS\ \% = (100 \times m_1 \times v_0)/(m_0 \times v_1) \qquad (V)$$

wherein $m_0$ designates the initial polymer amount (grams), $m_1$ defines the weight of residue (grams), $v_0$ defines the initial volume (millilitre) and $v_1$ defines the volume of the analysed sample (millilitre).

The fraction insoluble in p-xylene at 25° C. (XCU) is then equal to 100%−XCS %. The solution from the second 100 ml flask was treated with 200 ml of acetone under vigorous stirring. The precipitate was filtered and dried in a vacuum oven at 90° C. This solution can be employed in order to determine the amorphous part (AM) of the polymer (wt.-%) using the following equation:

$$AM = (100 \times m_1 \times v_0)/(m_0 \times v_1) \quad (VI)$$

wherein $m_0$ designates the initial polymer amount (g), $m_1$ defines the weight of residue (g), $v_0$ defines the initial volume (ml) and $v_1$ defines the volume of the analysed sample (ml).

Intrinsic Viscosity (IV of XCS)

Intrinisic viscosity (IV of XCS) is measured according to DIN ISO 1628/1, October 1999 (in Decalin at 135° C.) on the xylene soluble fraction (XCS).

Flexural Modulus

The flexural modulus was determined in 3-point-bending at 23° C. according to ISO 178 on 80×10×4 mm³ test bars injection moulded in line with EN ISO 1873-2.

Tensile Test

Tensile Test is measured according to ISO 527-2 using injection moulded specimens as described in EN ISO 1873-2 (1B dog bone shape, 4 mm thickness).

Notched Impact Strength (NIS):

The Charpy notched impact strength (NIS) was measured according to ISO 179 1eA at +23° C.; 0° C. or at −20° C. as indicated, using injection moulded bar test specimens of 80×10×4 mm³ prepared in accordance with EN ISO 1873-2.

Haze

Haze is determined according to ASTM D1003-00 on 60×60×1 mm³ plaques injection moulded in line with EN ISO 1873-2 and indicated as Haze$_1$ Puncture Energy Puncture energy (IPT) is determined in the instrumented falling weight test according to ISO 6603-2 using injection moulded plaques of 60×60×2 mm and a test speed of 2.2 m/s, clamped, lubricated striker with 20 mm diameter. The reported puncture energy results from an integral of the failure energy curve measured at (60×60×2 mm³).

Mechanical Performance Index MPI

The mechanical performance index (MPI) equals the product of tensile modulus (ISO527) [MPa] multiplied with Charpy notched Impact Strength at +23° C. [kJ/m²] (both determined on injection moulded specimen) and divided by the Meltflow Rate 230/2.16 [g/10 min]:

$$MPI = \frac{\text{tensile modulus } [MPa] * NIS \left[\frac{kJ}{m^2}\right]}{MFR230 / 2.16 \text{ [g/10 min]}} \quad (I)$$

Optomechnical Ability (OMA)

Optomechnical ability (OMA) is understood as the ratio of mechanical (especially impact and tensile) behaviour, to optical performance, namely haze, wherein the mechanical properties are targeted to be as high as possible and the optical performance is desired to be as low as possible.

The optomechanical ability is determined according the formula given below:

$$OMA = \frac{\text{tensile modulus } [MPa] * NIS \left[\frac{kJ}{m^2}\right]}{\text{Haze} (1 \text{ mm}) [\%]} \quad (II)$$

The puncture based optomechanical ability punc-OMA +23° C. is determined according the formula given below:

$$punc\text{-}OMA + 23 = \frac{\text{tensile modulus } [MPa] * (\text{Puncture Energy} + 23° C.) [J]}{\text{Haze} (1 \text{ mm}) [\%]} \quad (III)$$

The puncture based optomechanical ability punc-OMA −20° C. is determined according the formula given below:

$$punc\text{-}OMA - 20 = \frac{\text{tensile modulus } [MPa] * (\text{Puncture Energy} - 20° C.) [J]}{\text{Haze} (1 \text{ mm}) [\%]} \quad (IV)$$

Glass Transition Temperature (Tg)

The glass transition temperature (Tg) is determined by dynamic mechanical thermal analysis according to ISO 6721-7. The measurements are done in torsion mode on compression moulded samples (40×10×1 mm$_3$) between −100° C. and +150° C. with a heating rate of 2° C./min and a frequency of 1 Hz.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy (Hm) are determined from the second heating step.

Throughout the patent the term Tc or (Tcr) is understood as Peak temperature of crystallization as determined by DSC at a cooling rate of 10 K/min.

Description of Microstructure Quantification by NMR Spectroscopy

The comonomer content was determined by quantitative nuclear magnetic resonance ($^{13}$C-NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g. "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

Material Description:

Catalyst for HECO 1:

The catalyst for the heterophasic polypropylene component HECO 1 was rac-anti-Me$_2$Si(2-Me-4-(p-tBuPh)-Ind)(2-Me-4-Ph-5-OMe-6-tBu-Ind)ZrCl$_2$ prepared as described in WO2013007650.

Preparation of the Solid Catalyst System for HECO 1:

Inside the glovebox, 80 μL of a dry and degassed mixture of perfluoroalkylethyl acrylate ester were mixed in a septum vial with 2 mL of a 30 wt-% solution of MAO in toluene and left to react overnight. The following day, 58.9 mg of the metallocene of the invention rac-anti-Me$_2$Si(2-Me-4-Ph-6-tBu-Ind)(2-Me-4-Ph-5-OMe-6-tBu-Ind)ZrCl$_2$ (0.076 mmol, 1 equivalent) were dissolved with 4 mL of the MAO solution in another septum bottle and left to stir inside the glovebox. After 60 minutes, the 4 mL of the MAO-metallocene solution and 1 mL of the perfluoroalkylethyl acrylate ester mixture in MAO solution were successively added into a 50 mL emulsification glass reactor containing 40 mL of hexadecafluoro-1,3-dimethylcyclohexane kept at −10° C. and equipped with an overhead stirrer (stirring speed=600 rpm). Total amount of MAO is 5 mL (300 equivalents). A red emulsion formed immediately (measured emulsion stability=16 seconds) and was stirred during 15 minutes at 0° C./600 rpm. Then the emulsion was transferred via a 2/4 teflon tube to 100 mL of hot hexadecafluoro-1,3-dimethylcyclohexane heated to 90° C., and stirred at 600 rpm until the transfer is completed. The speed was reduced to 300 rpm. After 15 minutes stirring, the oil bath was removed and the stirrer turned off. The catalyst was left to settle up on top of the hexadecafluoro-1,3-dimethylcyclohexane and after 35 minutes the solvent was siphoned off. The remaining red catalyst was dried during 2 hours at 50° C. over an argon flow. 0.62 g of a red free flowing powder was obtained.

Preparation of the Catalyst for HECO 2:

The catalyst used in the polymerization processes for the heterophasic propylene copolymer (Heco 2) of the inventive examples (IE) was prepared as follows:

Used Chemicals:

20% solution in toluene of butyl ethyl magnesium (Mg(Bu)(Et), BEM), provided by Chemtura
2-ethylhexanol, provided by Amphochem
3-Butoxy-2-propanol—(DOWANOL™ PnB), provided by Dow
bis(2-ethylhexyl)citraconate, provided by SynphaBase
TiCl4, provided by Millenium Chemicals
Toluene, provided by Aspokem
Viscoplex® 1-254, provided by Evonik
Heptane, provided by Chevron Preparation of a Mg alkoxy compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component for HECO 2:

20.3 kg of TiCl4 and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethylaluminium (TEAL) as co-catalyst and dicyclopentyl dimethoxy silane (D-Donor) as donor.

The polymerization of HECO 1 and HECO 2 was performed in a Borstar PP pilot plant unit with liquid phase prepolymerization unit, bulk loop reactor and two gas phase reactors in series. Table 1 summarizes the polymerization data.

Elastomer:

The elastomer as used in comparative Examples CE1 and CE2 was Queo™ 8203, an unimodal ethylene based octene plastomer, MFR (190° C./2.16 kg) of 3 g/10 min, density 0.882 g/cm$^3$, produced in a solution polymerisation process using a metallocene catalyst. The product is commercially available at *Borealis* AG.

The inventive and comparative examples were compounded in a co-rotating twin-screw extruder Coperion ZSK 57 at 220° C. with 0.2 wt.-% of Irganox B225 (1:1-blend of Irganox 1010 (Pentaerythrityltetrakis(3-(3',5'-di-tert.butyl-4-hydroxytoluyl)-propionate and tris (2,4-di-t-butylphenyl) phosphate) phosphite) of BASF AG, Germany) and 0.1 wt.-% calcium stearate.

TABLE 1

Polymerisation data of the components HECO 1 and HECO 2

|  |  | HECO 1 | HECO 2 |
|---|---|---|---|
| Prepolymerzation |  |  |  |
| TEAL/Ti | [mol/mol] | — | 201 |
| TEAL/Donor | [mol/mol] | — | 7.9 |
| Temperature | [° C.] | 20 | 30 |
| Residence time | [h] | 0.43 | 0.33 |
| Loop |  |  |  |
| Temperature | [° C.] | 80 | 70 |
| R2 split | [wt.-%] | 41 | 31 |
| MFR 2.16 | [g/10 min] | 103 | 6 |
| C2 content | [wt.-%] | 0 | 2.0 |
| XCS | [wt.-%] | 1.3 | 5.3 |
| H2/C3 | [mol/kmol] | 0.65 | 1.15 |
| C2/C3 | [mol/kmol] | — | 46.7 |
| GPR1 |  |  |  |
| Temperature | [° C.] | 80 | 80 |
| R3 Split | [wt.-%] | 46 | 46 |
| MFR 2.16 | [g/10 min] | 125 | 2.2 |
| C2 after GPR1 | [wt.-%] | 1.27 | 6.0 |
| XCS after GPR1 | [wt.-%] | 3.0 | 17.9 |
| C2 in GPR1-fraction | [wt.-%] | 2.5 | 8.8 |
| XCS in GPR1-fraction | [wt.-%] | 4.5 | 26.4 |
| H2/C3 | [mol/kmol] | 6.7 | 2.6 |
| C2/C3 | [mol/kmol] | 80.5 | 46.7 |
| GPR2 |  |  |  |
| Temperature | [° C.] | 80 | 71 |
| R4 split | [wt.-%] | 13 | 23 |
| MFR 2.16 | [g/10 min] | 32.6 | 1.2 |
| C2 content | [wt.-%] | 17.9 | 15.0 |
| XCS | [wt.-%] | 22.5 | 39 |
| IV (XCS) | [dL/g] | 3.1 | 2.2 |
| C2(XCS) | [wt.-%] | 77.5 | 26.0 |
| H2/C2 | [mol/kmol] | 1.4 | 84 |
| C2/C3 | [mol/kmol] | 10000 | 252 |
| C2/XCU | wt.-% | 1.2 | 7.9 |
| IV/XCU | dL/g | 1.1 | 2.0 |
| MWD (XCS) |  | 2.5 | 5.2 |

Properties like e.g. "C2 after GPR1" are understood as measured on the polymer retrieved after the first gas phase reactor and including all fractions produced before and including the first gas phase reactor.

Properties like e.g. "C2 in GPR1-fraction" are understood to reflect the property of the fraction produced in the e.g. first gas phase reactor. The person skilled is aware that these properties can not be measured as such but are to be calculated based on the properties of the preceding (and measurable) fraction (produced in the loop reactor) and the polymer as available after the e.g. GPR1.

Heco 1 as described above is formed by first propylene random copolymer (P1) and the first elastomeric propylene copolymer (E1).

Heco 2 as described above is formed by the second propylene random copolymer (P2) and the second elastomeric propylene copolymer (E2).

The second propylene random copolymer (P2) corresponds to the polymer as available after the Loop and GPR1-polymerisation step as described above for Heco 2.

The polymer as produced in the GPR1 of Heco 2 corresponds to a preferred embodiment of the compatibilizer.

TABLE 2

Compositions of the Inventive and Comparative Examples:

|  |  | IE1 | IE2 | IE3 | CE1 | CE2 |
|---|---|---|---|---|---|---|
| Heco 1 | Wt.-% | 97 | 95 | 93 | 97 | 93 |
| Heco 2 | Wt.-% | 3 | 5 | 7 | 0 | 0 |
| ELASTOMER | Wt.-% | 0 | 0 | 0 | 3 | 7 |

It can be clearly seen from the data above, that the inventive examples show distinct improvements in view of improved compatibility between the matrix and a comonomer-rich elastomeric propylene copolymer embedded therein.

The multimodal random heterophasic polypropylene compositions of the present invention show improved stiffness and impact behaviour, especially in view of the biaxial impact behaviour at −20° C. as determined according to ISO06603.

The invention also provides multimodal random heterophasic polypropylene compositions having an improved mechanical performance index (MPI and having improved opto-mechanical ability (OMA) or improved puncture based optomechanical abilities at +23° C. or −20° C. (punc OMA +23 or punc OMA −20).

Furthermore it is shown, that the multimodal random heterophasic polypropylene compositions of the present invention provide good impact behaviour at lower amounts of external rubber components.

What is claimed is:

1. A multimodal random heterophasic polypropylene composition (m-Raheco) having a Melt Flow Rate (MFR230/2.16), determined according to ISO1133, of 1.0-100 g/10 min and is characterised by comprising
   70.0-94.0 wt.-% of a first propylene random copolymer (P1) and
   1.0-15.0 wt.-% of a second propylene random copolymer (P2) being different from the first propylene random copolymer (P1), and
   5.0-20.0 wt.-% of an elastomeric propylene copolymer (E) wherein the multimodal random heterophasic polypropylene composition (m-Raheco) comprises

TABLE 3

Properties of the Inventive and comparative examples

|  |  | IE1 | IE2 | IE3 | CE1 | CE2 | Heco 1 | Heco 2 |
|---|---|---|---|---|---|---|---|---|
| MFR 230/2.16 | [g/10 min] | 30.0 | 30.3 | 28.3 | 32.4 | 28.3 | 38 | 3.9 |
| Comonomer content | [wt.-%] | 21.4 | 21.3 | 21.1 |  |  |  |  |
| XCS total | [wt.-%] | 22.2 | 22.7 | 23.1 |  |  |  |  |
| Co(XCS) |  | 76.5 | 74.3 | 74.1 |  |  |  |  |
| IV (XCS) |  | 3.1 | 3.0 | 3.0 |  |  |  | 3.1 | 2.2 |
| Glass transition Temperatures |  |  |  |  |  |  |  |  |
| Tg1 | [° C.] | −64 | −64 | −64 | −65 | −66 | −64° C. |  |
| Tg2 | [° C.] | −47 | −47 | −47 | n.a. | n.a. | n.a. | −47° C. |
| Tg3 | [° C.] | +1 | 0 | −1 | +2 | +2 | +2° C. | −7° C. |
| Impact Strength @ 23° C. | [kJ/m$^2$] | 5.4 | 6.1 | 6.72 | 3.6 | 3.6 | 3.4 | 77 |
| tensile modulus | [MPa] | 846 | 837 | 827 | 804 | 746 | 808 | 330 |
| IPT: |  |  |  |  |  |  |  |  |
| Maximum Force @ +23° C. | [N] | 1849 | 1846 | 1833 | 1490 | 1563 | 1519 |  |
| Deflection at max. force | [mm] | 11.9 | 12.1 | 12 | 8.7 | 9.9 | 8.9 |  |
| Energy to max. force | [J] | 11.6 | 11.9 | 11.6 | 5.9 | 7.3 | 6 |  |
| Puncture deflection | [mm] | 14.1 | 16.5 | 17.7 | 9.2 | 10.4 | 9.4 |  |
| Puncture energy @ +23° C. | [J] | 15.3 | 18.9 | 20.4 | 6.4 | 7.9 | 6.6 |  |
| Maximum Force @ −20° C. | [N] | 1279 | 1790 | 2630 | 1085 | 1383 | 1030 |  |
| Deflection at max. force | [mm] | 5.5 | 6.7 | 7.8 | 4.5 | 5.9 | 4.4 |  |
| Energy to max. force | [J] | 3.2 | 5.2 | 9.4 | 2.2 | 3.3 | 2 |  |
| Puncture deflection | [mm] | 6 | 7.2 | 8.3 | 5 | 6.4 | 4.9 |  |
| Puncture energy @ −20° C. | [J] | 3.7 | 5.9 | 10.4 | 2.6 | 3.8 | 2.4 |  |
| Transparency | [%] | 89.8 | 89.6 | 89.5 | 89.9 | 90 | 90.7 |  |
| Haze$_1$ | [%] | 72.8 | 74.6 | 73.9 | 74.1 | 77.2 | 66.6 |  |
| Clarity @ 1 mm | [%] | 71 | 71.8 | 75.4 | 59.1 | 49.5 | 74.5 |  |
| OMA |  | 62.7 | 68.0 | 75.2 | 39.2 | 34.3 | 40.8 |  |
| MPI |  | 152 | 168 | 197 | 90 | 94 | 71 |  |
| punc OMA +23 |  | 178 | 212 | 228 | 69 | 76 | 80 |  |
| punc Oma −20 |  | 43 | 66 | 116 | 28 | 37 | 29 |  |

17.0-32.0 wt.-% of a fraction soluble in cold xylene (XCS), wherein said fraction soluble in cold xylene (XCS) having
a comonomer content Co(XCS) of 65.0-85.0 wt.-% and
an intrinsic viscosity (IV) in the range of at least 2.5 dl/g when measured in Decalin according to ISO 1628.

2. The multimodal random heterophasic polypropylene composition (m-Raheco) according to claim 1, which is characterised by at least three glass transition temperatures Tg1, Tg2 and Tg3, wherein either
at least two of said glass transition temperatures are below 0° C. and/or
at least three glass transition temperatures are below +10° C., and/or
the difference between the two lowest glass transition temperatures is at least 10 K or more.

3. The multimodal random heterophasic polypropylene composition (m-Raheco) according to claim 1 wherein the second propylene random copolymer (P2) is characterised by
a comonomer content of 4.0-15.0 wt.-% and
10.0-30.0 wt.-% of a fraction soluble in cold xylene (XCS).

4. The multimodal random heterophasic polypropylene composition (m-Raheco) according to claim 1, wherein the elastomeric propylene copolymer (E) comprises a first elastomeric propylene copolymer (E1) and a second elastomeric propylene copolymer (E2), wherein the first elastomeric propylene copolymer (E1) is characterised by having
a1) an intrinsic viscosity (IV) in the range of 2.6-4.5 and/or
b1) a comonomer content Co(XCS) of 62.0-85.0 wt.-%, and the second elastomeric propylene copolymer (E2), is characterised (independently of the first) by having
a2) an intrinsic viscosity (IV) in the range of 1.2-2.5 dl/g and/or
b2) a comonomer content Co(XCS) of 18.0-33.0 wt.-%.

5. The multimodal random heterophasic polypropylene composition (m-Raheco) according to claim 1,
wherein the multimodal random heterophasic polypropylene composition (m-Raheco) is produced by mixing a first heterophasic propylene copolymer (Heco 1) and second heterophasic propylene copolymer (Heco 2),
wherein the first heterophasic propylene copolymer (Heco 1) comprises a first propylene random copolymer (P1) as a first matrix (PM1) and a first elastomeric propylene copolymer (E1) dispersed therein, and
wherein the second heterophasic propylene copolymer (Heco 2) comprises the second propylene random copolymer (P2) as a second matrix (PM2) and a second elastomeric propylene copolymer (E2) dispersed therein.

6. The multimodal random heterophasic polypropylene composition (m-Raheco) according to claim 5, comprising
85.0-99.0 wt.-% of the first heterophasic propylene copolymer (Heco 1) and
1.0-15.0 wt.-% of the second heterophasic propylene copolymer (Heco 2).

7. The multimodal random heterophasic polypropylene composition (m-Raheco) according to claim 6, wherein
the first heterophasic propylene copolymer (Heco 1) is produced in the presence of a metallocene based catalyst and/or
the second heterophasic propylene copolymer (Heco 2) is produced in the presence of a Ziegler-Natta-catalyst.

8. The multimodal random heterophasic polypropylene composition (m-Raheco) according to claim 5, wherein
the first heterophasic propylene copolymer (Heco 1) is produced in the presence of a metallocene based catalyst and/or
the second heterophasic propylene copolymer (Heco 2) is produced in the presence of a Ziegler-Natta-catalyst.

9. The multimodal random heterophasic polypropylene composition (m-Raheco) according to claim 1, characterised by:
a tensile modulus of at least 750 MPa when measured according to ISO527 and/or
a Charpy notched impact Strength (NIS) of at least 4.0 kJ/m² when measured according to ISO179/1eA at +23° C. and/or
a optomechanical ability (OMA) of at least 40, wherein the optomechanical ability (OMA) is determined according the formula:

$$OMA = \frac{\text{tensile modulus [MPa]} * NIS \left[\frac{kJ}{m^2}\right]}{\text{Haze (1 mm)[\%]}}.$$

10. The multimodal random heterophasic polypropylene composition (m-Raheco) according to claim 1, characterised by:
tensile modulus of at least 750 MPa and
either or both of:
a puncture based optomechanical ability at +23° C. (punc-OMA +23) of at least 80 or more when determined according to the formula $$punc\text{-}OMA + 23 = \frac{\text{Tensile modulus [MPa]} * (\text{Puncture Energy} + 23° C.) [J]}{\text{Haze (1 mm) [\%]}}$$

and/or
a puncture based optomechanical ability at −20° C. (punc-OMA −20) of at least 40 or more when determined according to the formula $$punc\text{-}OMA - 20 = \frac{\text{Tensile modulus [MPa]} * (\text{Puncture Energy} - 20° C.) [J]}{\text{Haze (1 mm) [\%]}}.$$

11. The multimodal random heterophasic polypropylene composition (m-Raheco) according to claim 1, wherein the second propylene random copolymer (P2) has a higher comonomer content and a higher amount of fraction soluble in cold xylene (XCS) than the first propylene random copolymer (P1).

12. A method comprising producing moulded articles or packaging articles with a multimodal random heterophasic polypropylene composition (m-Raheco) according to claim 1.

13. Moulded articles comprising the multimodal random heterophasic polypropylene composition (m-Raheco) according to claim 1.

* * * * *